United States Patent
Lapeyre et al.

(10) Patent No.: US 7,789,221 B2
(45) Date of Patent: Sep. 7, 2010

(54) LIVING-HINGE CONVEYOR BELT

(75) Inventors: Robert S. Lapeyre, New Orleans, LA (US); Philip M. LeBlanc, Folsom, LA (US); Kevin W. Guernsey, Kenner, LA (US)

(73) Assignee: Laitram, L.L.C., Harahan, LA (US)

( * ) Notice: Subject to any disclaimer, the term of this patent is extended or adjusted under 35 U.S.C. 154(b) by 147 days.

(21) Appl. No.: 12/239,217

(22) Filed: Sep. 26, 2008

(65) Prior Publication Data

US 2010/0078296 A1    Apr. 1, 2010

(51) Int. Cl.
B65G 17/00 (2006.01)
(52) U.S. Cl. ............ 198/844.2; 198/847; 198/850
(58) Field of Classification Search ........... 198/844.2, 198/847, 850–853
See application file for complete search history.

(56) References Cited

U.S. PATENT DOCUMENTS

| | | | |
|---|---|---|---|
| 3,078,206 A | 2/1963 | Skura | |
| 3,157,056 A | 11/1964 | Gray | |
| 3,404,578 A | 10/1968 | Koch et al. | |
| 3,602,364 A | 8/1971 | Maglio et al. | |
| 3,772,929 A | 11/1973 | Redmond, Jr. | |
| 3,853,016 A | 12/1974 | Lane, III et al. | |
| 3,941,238 A | 3/1976 | Lapeyre | |
| 3,945,263 A * | 3/1976 | Simonsen et al. | 198/847 |
| 4,072,062 A | 2/1978 | Morling et al. | |
| 4,084,687 A | 4/1978 | Lapeyre | |
| 4,138,011 A | 2/1979 | Lapeyre | |
| 4,170,281 A | 10/1979 | Lapeyre | |
| 4,364,421 A * | 12/1982 | Martin | 198/847 |
| 4,449,958 A | 5/1984 | Conrad | |
| 4,617,075 A | 10/1986 | Wetzel et al. | |
| 4,634,409 A | 1/1987 | Johnson et al. | |
| 4,855,174 A | 8/1989 | Kawamoto | |
| 5,377,819 A | 1/1995 | Horton et al. | |
| 5,653,656 A | 8/1997 | Thomas et al. | |
| 5,911,307 A | 6/1999 | Kraft et al. | |
| 5,921,378 A | 7/1999 | Bonnet | |
| 6,216,853 B1 | 4/2001 | Fujita | |
| 6,321,904 B1 | 11/2001 | Mitchell | |

(Continued)

FOREIGN PATENT DOCUMENTS

EP    239660    * 10/1987    ............. 198/847

(Continued)

OTHER PUBLICATIONS

Cog-Veyor System Drawings, www.cog-veyor.com, Cog-Veyor Systems Inc. 371 Hanlan Road Woodridge Ontario Canada.

(Continued)

*Primary Examiner*—James R Bidwell
(74) *Attorney, Agent, or Firm*—James T. Cronvich

(57) ABSTRACT

A conveyor belt having rodless, living hinges and a method for making such a belt. One version of the belt has spaced apart belt modules joined by tension members spanning the gaps between consecutive modules. The tension members bend in the gaps to allow the belt to articulate. Resilient fillers encapsulate the tension members and, together with top surfaces of the modules, form a generally continuous article-contacting belt surface. The belt may be made by molding the rigid belt modules and the resilient fillers onto an arrangement of elongated tension members.

27 Claims, 8 Drawing Sheets

U.S. PATENT DOCUMENTS

| | | | |
|---|---|---|---|
| 6,540,069 B2 * | 4/2003 | Tschantz | 198/844.1 |
| 6,561,344 B1 | 5/2003 | Basse | |
| 6,695,134 B2 * | 2/2004 | Rubino et al. | 198/851 |
| 6,811,023 B1 | 11/2004 | Christiana et al. | |
| 7,210,573 B2 | 5/2007 | Mol | |
| 2004/0089519 A1 | 5/2004 | Pollack et al. | |
| 2006/0006051 A1 | 1/2006 | Guernsey | |
| 2007/0267277 A1 | 11/2007 | Mol et al. | |
| 2008/0110727 A1 | 5/2008 | Fandella | |

FOREIGN PATENT DOCUMENTS

| | | |
|---|---|---|
| GB | 2032872 A | 5/1980 |

OTHER PUBLICATIONS

International Search Report and Written Opinion of the International Searching Authority in re PCT/US09/57618; Dec. 18, 2009; European Patent Office, Rijswijk, NL.

\* cited by examiner

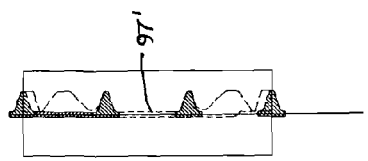
FIG. 12C
FIG. 12F
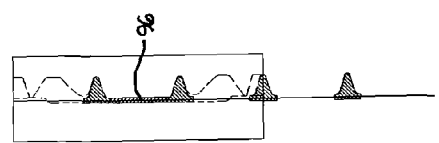
FIG. 12B
FIG. 12E
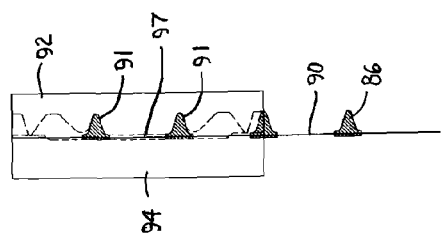
FIG. 12A
FIG. 12D

LIVING-HINGE CONVEYOR BELT

BACKGROUND

The invention relates generally to power-driven conveyors and, more particularly, to molded conveyor belts with living hinges.

Modular plastic conveyor belts, because they do not corrode, are popular for conveying food items. And, because they are positively driven by sprockets, they do not require the constant tensioning needed by flat conveyor belts. Modular plastic conveyor belts are constructed of rows of belt modules connected side by side and end to end by hinge rods through the interleaved hinge eyes of adjacent belt rows. The hinges between adjacent rows allow the belt to articulate about sprockets and backflex on the return. But the nooks and crannies in the hard-to-clean hinge area can harbor fats and other debris that carry bacteria. Furthermore, the articulation of adjacent belt rows at the hinges causes wear on the hinge pins and the hinge eyes that is exacerbated in abrasive environments, such as in conveying potatoes and other dirt-laden products.

Thus, there is a need for a conveyor belt that is easy to clean and longer-lasting in abrasive environments.

SUMMARY

This need and other needs are satisfied by a conveyor belt embodying features of the invention. In particular, one version of such a conveyor belt comprises a plurality of belt modules, each of which extends in a direction of belt travel from a first edge to a second edge and has an article-contacting side and an opposite driven side that includes one or more rigid drive surfaces. The first edge of each belt module is spaced apart from the second edge of an adjacent module across a gap. Tension members extend through the first and second edges of the belt modules to span the gaps and connect adjacent modules together. Resilient fillers encapsulate the tension members and fill the gaps the between adjacent modules.

Another version of a conveyor belt comprises a plurality of drive elements, each having an article-contacting side and an opposite driven side that includes one or more rigid drive surfaces. Resilient fillers, each having an article-contacting side, are disposed between consecutive drive elements. Tension members extending through the drive elements and the fillers hold the belt together and bear the majority of the belt tension.

Still another version of a conveyor belt comprises a plurality of rigid belt modules, each extending in a direction of belt travel from a first edge to a second edge and having an article-contacting side and an opposite side. The first edge of each of the rigid belt modules is spaced apart from the second edge of a consecutive rigid belt module across a gap. The length of the gaps in the direction of belt travel equals or exceeds the length of the rigid belt modules in the direction of belt travel. Resilient segments joining consecutive rigid belt modules fill the gaps and form a flexible hinge between consecutive modules. Together with the article-contacting sides of the rigid belt modules, the resilient segments form a continuous article-conveying surface of the belt.

Yet another version of a conveyor belt comprises a plurality of rigid belt modules. Each module extends in a direction of belt travel from a first edge to a second edge and has an article-contacting side and an opposite side. The first edge of a rigid belt module is spaced apart from the second edge of a consecutive rigid belt module across a gap. Resilient elastomeric segments molded directly to the first and second edges of consecutive belt modules fill the gaps to form a flexible hinge between consecutive rigid belt modules and, together with the article-contacting side of the rigid belt modules, a continuous article-conveying surface of the belt.

Another aspect of the invention provides a method for making a conveyor belt. The method comprises: (a) molding a rigid belt module onto an arrangement of elongated tension members extending past leading and trailing edges of the belt module; (b) molding a resilient filler onto the arrangement of elongated tension members adjacent to the trailing edge of the rigid belt module; and (c) repeating steps (a) and (b) to form a conveyor belt of desired length having an alternating sequence of rigid belt modules and resilient fillers along the elongated tension members.

BRIEF DESCRIPTION OF THE DRAWINGS

These aspects and features of the invention, as well as its advantages, are better understood by referring to the following description, appended claims, and accompanying drawings, in which:

FIGS. 12A-12F are side elevation views corresponding to the views of FIGS. 11A-11F.

DETAILED DESCRIPTION

Figure 1:
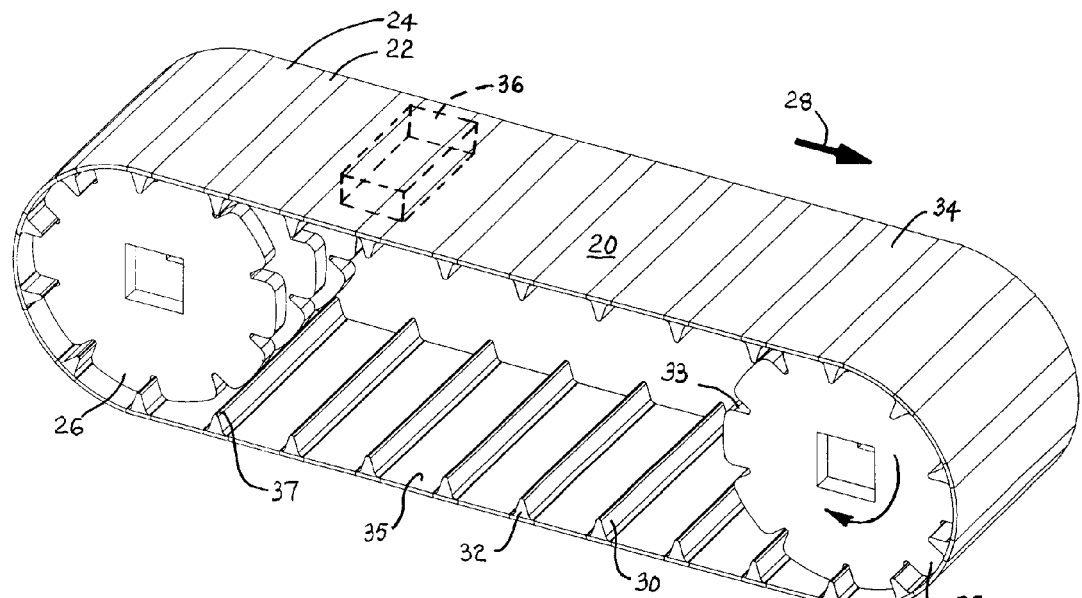
FIG. 1 is an isometric view of one version of a conveyor belt having living hinges according to the invention.

One example of a conveyor belt embodying features of the invention is shown in FIG. 1. The belt 20 comprises an alternating series of belt modules 22 and resilient fillers 24 arranged to form an endless belt loop that is trained around sprocket sets 26. The sprocket sets are mounted conventionally on shafts (not shown). One of the shafts is coupled to a drive motor (not shown), which rotates the shaft and the sprockets to advance the belt in a direction of belt travel 28.

The sprocket set at the other end of the conveyor is not directly driven by a motor; its shaft is an idle shaft. Drive surfaces 30 formed on rigid drive bars 32 extending outward from the belt modules and perpendicular to the direction of belt travel are engaged by driving surfaces 33 formed on the peripheries of the sprockets to advance the belt in the direction of belt travel. In this example, the belt modules are essentially drive elements molded of a rigid material, such as polyethylene, polypropylene, polyurethane, nylon, acetal, or composite materials, to form stiff drive surfaces. The fillers are formed of a resilient material, such as rubber or an elastomer, which allows the filler elements of the belt to flex around the sprocket sets and around return shoes or rollers. The conveyor belt, as well as the belt modules and the fillers, has an article-contacting side 34, on which articles 36 are conveyed, and an opposite driven side 35, which engages the sprocket sets. The drive bars extend outward to distal ends 37 that are spaced farther from the driven side than is any other rigid module structure. Preferably, the percentage of the area of the article-contacting side of the belt formed by the fillers equals or exceeds that formed by the belt modules, but it could be less.

Figure 2:
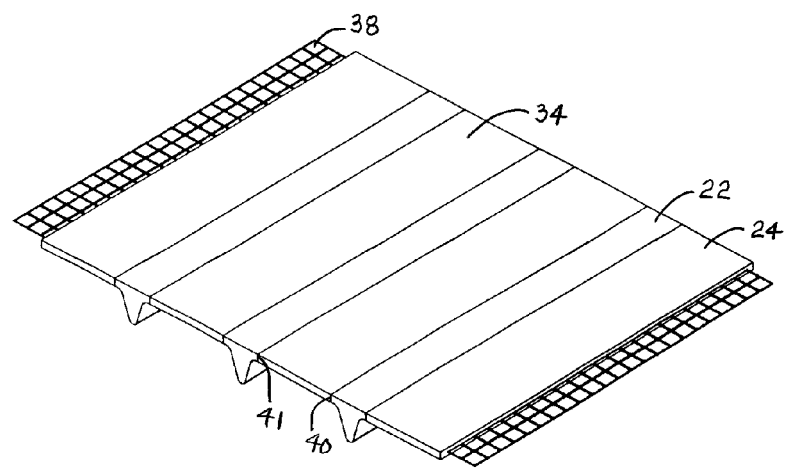
FIG. 2 is an isometric view of a portion of the conveyor belt of FIG. 1.

A section of the belt of FIG. 1 is shown in FIG. 2. A fabric mesh 38 extends through both the rigid belt modules 22 and the resilient fillers 24. The mesh is one form of reinforcing tension member for the conveyor belt. The mesh may be made of Kevlar® or other strong fiber that can bend between consecutive rigid belt modules 22 to form a living hinge. The filler fills the gaps between adjacent belt modules, encapsulating the reinforcing mesh and forming, with the top sides of the belt modules, a generally continuous article-contacting surface 34 of the belt. The resilient filler butts up against first and second edges 40, 41 of the modules. The filler may be sealed, bonded, or welded to the edges of the module to eliminate spaces between the fillers and the modules, but could be unbonded in some applications.

Figure 3:
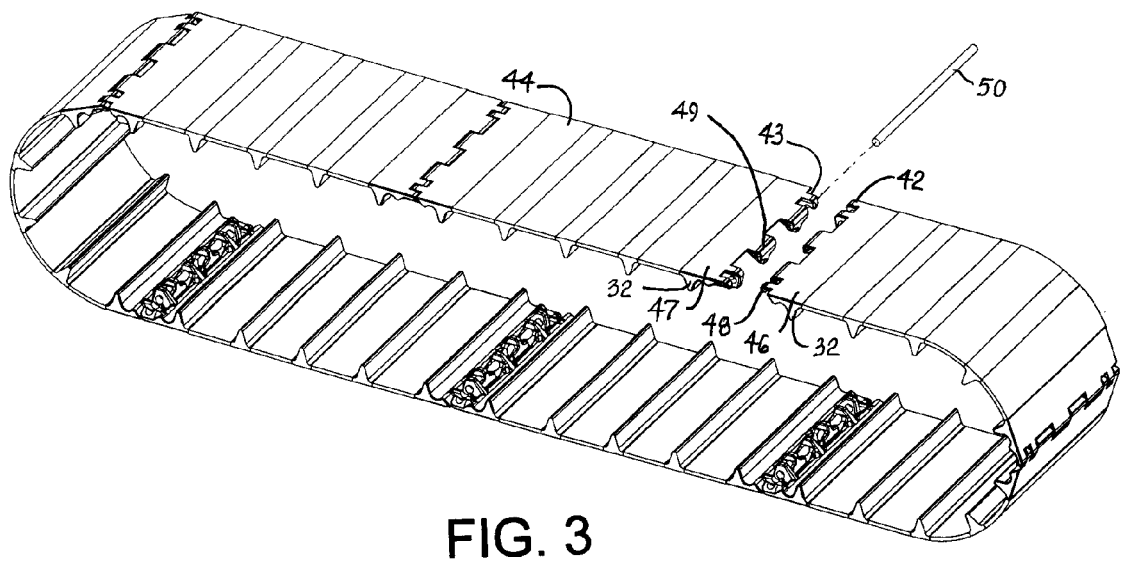
FIG. 3 is an isometric view of another version of a conveyor belt according to the invention with living hinges at most hinge joints and hinge rods at a few other hinge joints.

The belt loop in FIG. 1 is closed by welding two complementary partial belt modules or two partial fillers at opposite ends of the length of belting together or by welding a belt module at one end to a filler at the other end of the length of belting. Another way to close the belt loop is illustrated in FIG. 3. Opposite ends 42, 43 of the length of belting 44 are formed of elongated rigid belt modules 46, 47. Hinge members 48, 49 on each module are arranged to interleave. Aligned openings in the interleaved hinge elements form a lateral passageway across the width of the belt. A hinge rod 50 inserted into the passageway closes the loop to form an endless belt. The lengths of the mating elongated modules is such that the hinge formed at the hinge rod is midway between the drive bars 32 to maintain the belt's pitch. Although the belt shown in FIG. 3 is constructed of seven segments, each of which terminates at opposite ends in elongated connection modules, the belt could be constructed of more or fewer segments, including a single segment.

Figure 4:
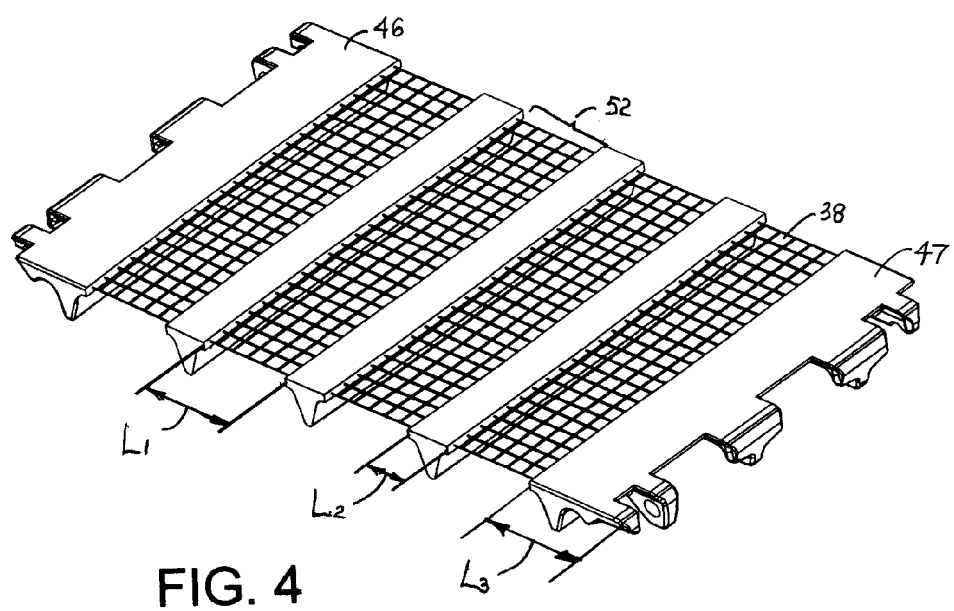
FIG. 4 is an isometric view of one section of the belt of FIG. 3 with filler material removed to show reinforcing structure.

Each segment is shown in FIG. 4 with the filler material removed for clarity. Like the segment of FIG. 2, the segment of FIG. 4 has a reinforcing mesh 38 that terminates into two elongated hinge modules 46, 47. All the belt modules in the segment are spaced apart by gaps 52 in which the fillers (not shown) reside. Most, if not all, of the tension in the belt is borne by the mesh. In this way, the filler does not have to be strong; it just has to fill the gap. And the mesh inherently flexes easily to make the living hinges between consecutive rigid belt modules. In the version shown in FIG. 4, the length $L_1$ of the gap 52 is about equal to or exceeds the lengths of $L_2$, $L_3$ of the belt modules. But $L_1$ could be less than $L_2$ and $L_3$ in other versions.

Figure 5:
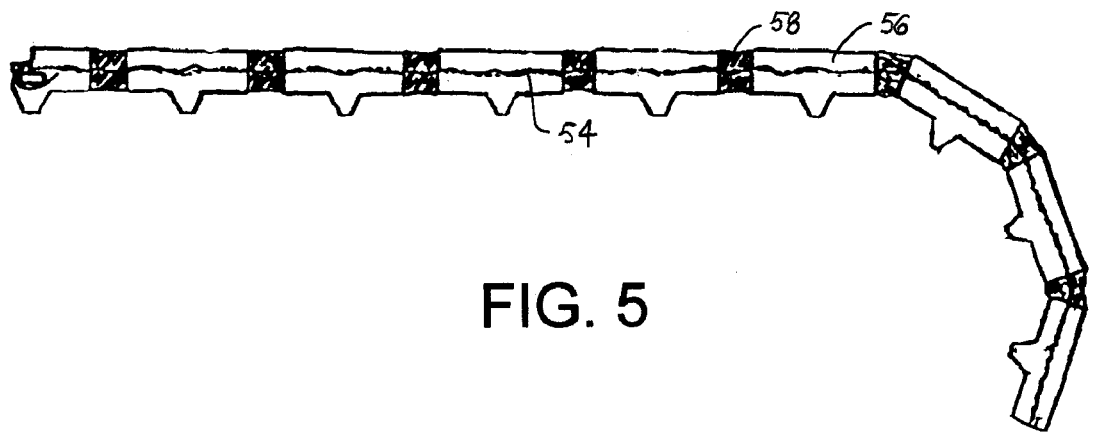
FIG. 5 is a side elevation view of a portion of another version of a conveyor belt having living hinges according to the invention.
Figure 6:
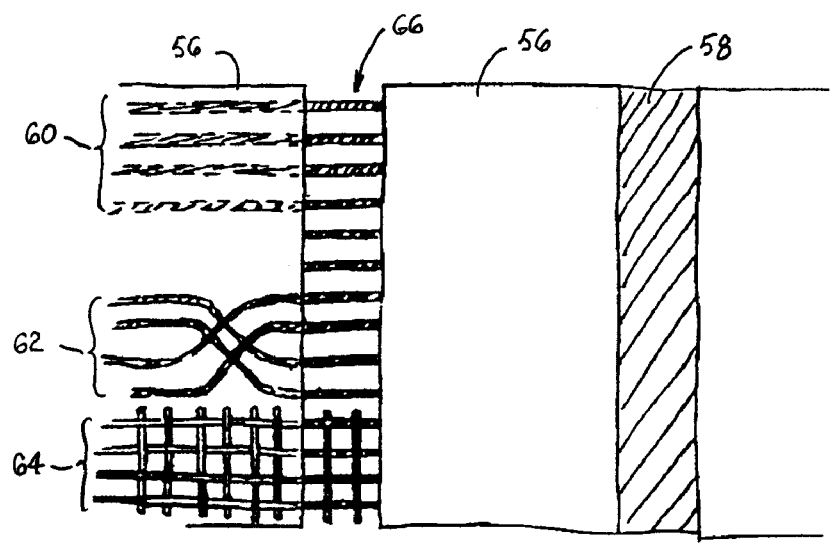
FIG. 6 is a top plan view of the conveyor belt in FIG. 5 showing alternative tension members.

Another version of a conveyor belt having a living hinge is shown in FIG. 5. The belt in this version includes tension members 54 extending the length of the belt through belt modules 56 and fillers 58. In this version of the belt, the filler material makes up a much smaller portion of the length of the belt. The tension members, as illustrated in FIG. 6, may be realized as microcables 60, braided wire cloth 62, or mesh wire cloth 64. Using metal cables or cloth greatly increases the strength of the belt, while allowing it to flex in the gap 66 and form a living hinge between consecutive belt modules 56.

Figure 7:
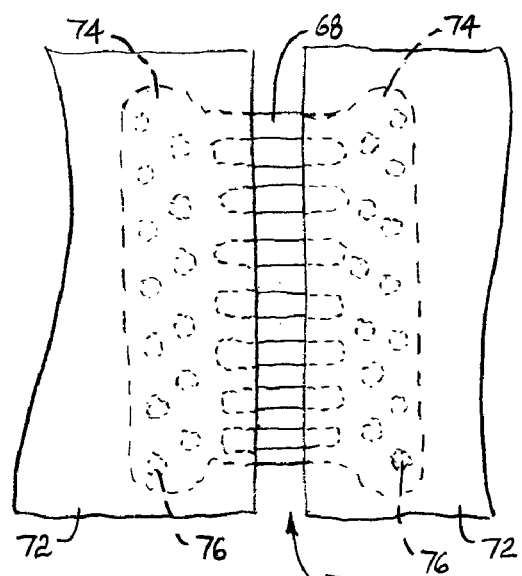
FIG. 7 is a top plan view of a portion of the belt of FIG. 5 showing another tension member.
Figure 8:
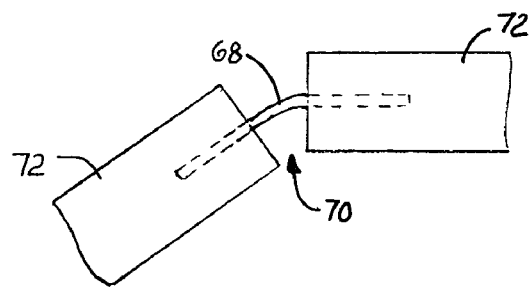
FIG. 8 is a side elevation view of the belt portion of FIG. 7 in a flexed condition.

Another version of a tension member is shown in FIGS. 7 and 8. Thin, flexible metal or plastic straps 68 span the gap 70 between adjacent rigid modules 72. In this version, eight straps are formed in parallel between two base pads 74. The modules are molded around the base pads. Holes 76 through the base pads are filled with plastic in the molding process to anchor the base pads firmly in place. The thin straps flex easily in the gap 70 and carry the majority or all of the belt tension across the gap. The gap is filled with a resilient filler material (not shown) as in FIG. 5. If the straps are made of plastic, they could alternatively be unitarily molded along with the rigid modules out of the same material. In that case, there would be no base pads as in FIGS. 7 and 8—just the straps, or other plastic connecting webbing, between the modules with the gaps filled with an elastomeric filler material.

Figure 9:
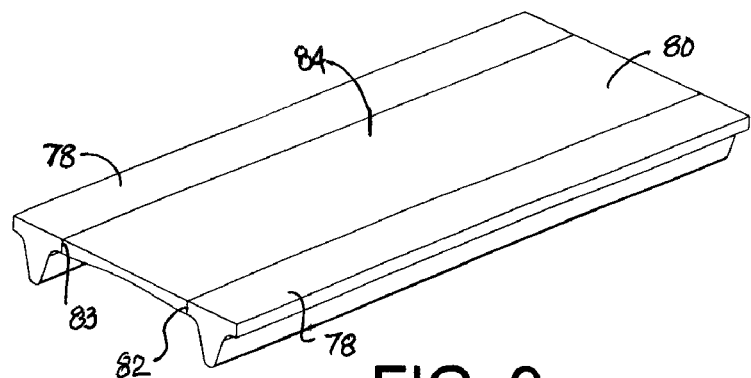
FIG. 9 is an isometric view of another version of a section of a conveyor belt as in FIG. 1.

Another version of a belt segment is shown in FIG. 9. In this version, which does not include a reinforcing mesh or cable, a living hinge is formed between consecutive rigid plastic modules 78 by a thinned-out intermediate section 80. The intermediate section is preferably thinner at its middle than at its ends that abut and are attached to the edges 82, 83 of the belt modules. In this example, the intermediate section serves as a tension member and also forms a major portion of the article-contacting surface 84 of the belt. Because the intermediate section is so long, it need not be made of a rubber or elastomeric material to be able to bend. Instead, it could be made of rigid plastic material that is thin enough to bend easily and allow the belt to articulate about the sprockets. But it could be made of an elastomeric material, with or without a thinned-out middle, that is bonded directly to the facing edges of consecutive rigid modules.

Figure 10A:
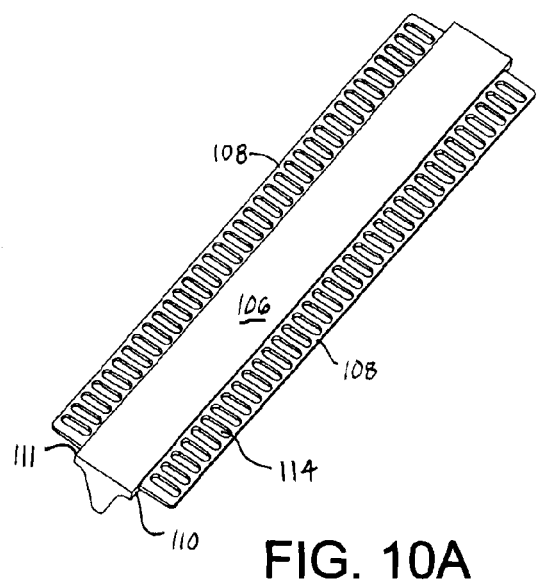
FIG. 10A is an isometric view of another version of a rigid belt module for use in a conveyor belt as in FIG. 1, in which the module is provided with attachment wings.
Figure 10B:
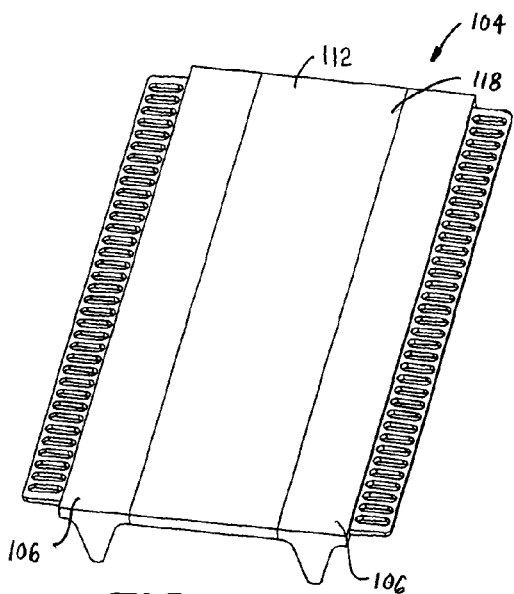
FIGS. 10B and 10C are oblique and side elevation views of a conveyor belt section incorporating the rigid belt module of FIG. 10A.
Figure 10C:
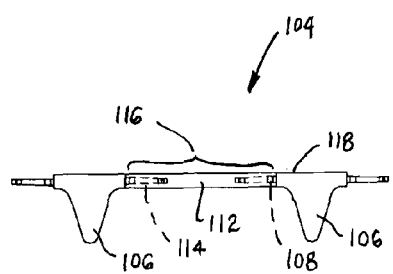
Figure 11C:
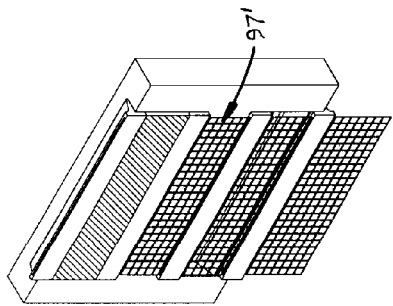
FIGS. 11A-11F are isometric views of one mold half showing the sequence of one method of making a conveyor belt as in FIG. 1.
Figure 11F:
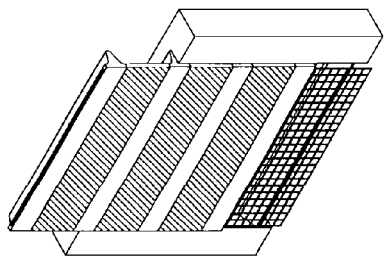
Figure 11B:
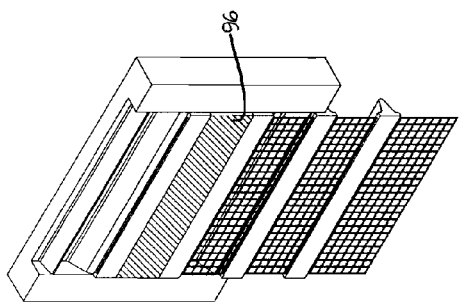
Figure 11E:
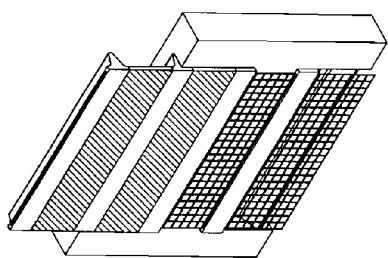
Figure 11A:
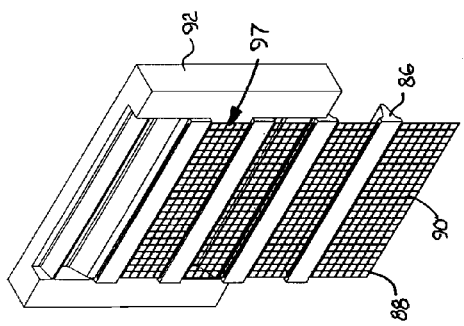
Figure 11D:
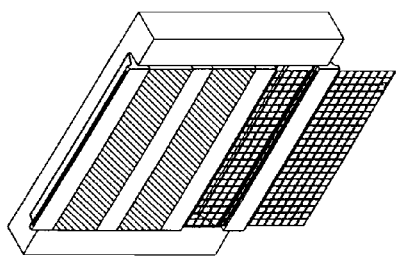

Another version of a belt segment is shown in FIGS. 10B and 10C. The belt segment 104 is made of rigid modules 106 having wings 108 extending outward from first and second edges 110, 111 of the modules, as shown in FIG. 10A, alternating with resilient segments 112. The wings, which are thinner than the edge portions of the rigid module from which they extend, have molded-in perforations 114. During the molding of the elastomeric material forming the resilient segments to the rigid modules, the material flows into the perforations. When the material hardens, the resilient segments are anchored mechanically to the wings they encapsulate and fill the gaps 116 between consecutive rigid modules. Besides being mechanically anchored, the elastomeric material can also be bonded to the wings. Because the wings are thin, even though molded out of the same material as the rigid belt modules, they can bend in the gaps to form, with the elastomeric material, living hinges. Together, the rigid belt modules and the intervening resilient segments preferably form a continuous article-conveying surface 118 on the belt.

One way to construct a belt made with reinforcing tension members, such as those in FIG. 2, is shown in FIGS. 11 and 12. In this example, rigid belt modules 86 are molded onto an arrangement of elongated members 88, such as the longitudinal strands in a reinforcing mesh 90. The leading two consecutive modules are positioned in cavities 91 in a base mold half 92, as shown in FIGS. 11A and 12A. A confronting mold half 94 closes against the base mold half. An elastomeric material is injected into the mold to form the mesh-encapsulating filler 96 in the gap 97 between consecutive rigid belt modules, as shown in FIGS. 11B and 12B. The mold halves are opened and the modules are indexed forward one position in the base mold to align the next gap 97' with the confronting mold half, which closes on the base half to mold the filler. This indexed molding process continues as shown in FIGS. 11C-11F and 12C-12F to form a belt segment of a desired length.

Figures 13A, 13B, 13C, 13D:
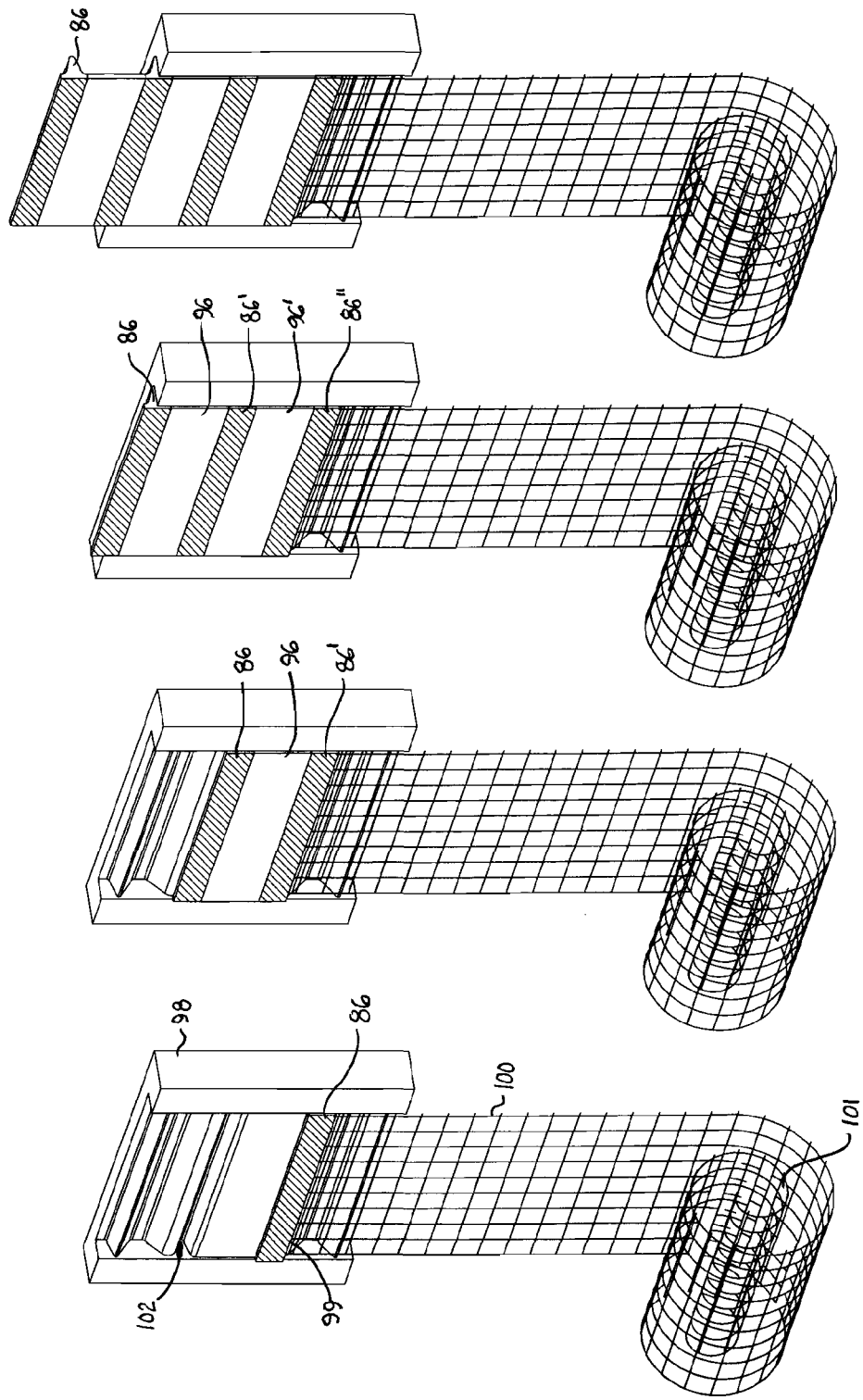
FIGS. 13A-13D are isometric views of one mold half showing the sequence of another method of making a conveyor belt as in FIG. 1.

An alternative way of constructing a reinforced belt is shown in FIGS. 13A-13D. (Only the base mold half 98 is shown in FIG. 13 for clarity; the confronting mold halves are not shown.) First, a rigid belt module 86 is molded in a lower cavity 99 onto a reinforcing mesh 100 fed from a roll 101. The rigid belt module is then indexed forward to a second cavity 102. As shown in FIG. 13B, a consecutive rigid belt module 86' is then molded onto the mesh in the lower cavity. Next, a mesh-encapsulating filler 96 is molded between the two belt modules 86 and 86'. The confronting mold half (not shown) is then retracted, and the modules are indexed forward to the next cavities, as in FIG. 13C. Then a third module 86" is molded onto the mesh, followed by a second filler 96' between the two most recently molded modules 86' and 86". The sequence of indexing, molding a rigid belt module on the mesh, and molding a filler segment between the two most recently molded modules repeats, as illustrated in FIG. 13D, to build a belt of a desired length. The same sequential molding procedure may be used to mold an unreinforced belt by eliminating the reinforcing mesh.

Although the invention has been described with respect to a few preferred versions, other versions are possible. For example, the rigid drive surfaces on the belt modules could be formed in recessed pockets rather than on protruding drive bars. So, as this one example suggests, the claims are not meant to be limited to the details of the preferred versions.

What is claimed is:

1. A conveyor belt comprising:
    a plurality of belt modules, each extending in a direction of belt travel from a first edge to a second edge and having an article-contacting side and an opposite driven side including one or more rigid drive surfaces, wherein the first edge of a belt module is spaced apart from the second edge of an adjacent module across a gap;
    tension members extending through the first and second edges of the belt modules to span the gaps and connect adjacent modules;
    resilient fillers encapsulating the tension members and filling the gaps between adjacent modules.

2. A conveyor belt as in claim 1 wherein the resilient fillers are joined to the opposing first and second edges of adjacent modules.

3. A conveyor belt as in claim 1 wherein the resilient fillers are made of an elastomeric or rubber material.

4. A conveyor belt as in claim 1 wherein the tension members comprise a fabric mesh.

5. A conveyor belt as in claim 1 wherein the tension members comprise thin, bendable straps.

6. A conveyor belt as in claim 1 wherein the tension members comprise parallel metal cables.

7. A conveyor belt as in claim 1 wherein the tension members comprise wire cloth.

8. A conveyor belt as in claim 1 wherein the length of the gaps in the direction of belt travel equals or exceeds the length of the modules in the direction of belt travel.

9. A conveyor belt comprising:
    a plurality of drive elements having an article-contacting side and an opposite driven side including one or more rigid drive surfaces;
    a plurality of resilient fillers having an article-contacting side and disposed between consecutive drive elements;
    tension members extending through the drive elements and the fillers to hold the belt together and bear the majority of the belt tension.

10. A conveyor belt as in claim 9 wherein the resilient fillers are joined to the opposing first and second edges of adjacent modules.

11. A conveyor belt as in claim 9 wherein the resilient fillers are made of an elastomeric or rubber material.

12. A conveyor belt as in claim 9 wherein the tension members comprise a fabric mesh.

13. A conveyor belt as in claim 9 wherein the tension members comprise thin, bendable straps.

14. A conveyor belt as in claim 9 wherein the tension members comprise parallel metal cables.

15. A conveyor belt as in claim 9 wherein the tension members comprise wire cloth.

16. A conveyor belt as in claim 9 wherein the area of the article-contacting sides of the fillers equals or exceeds the area of the article-contacting sides of the drive elements.

17. A conveyor belt comprising:
    a plurality of rigid belt modules, each extending in a direction of belt travel from a first edge to a second edge and having an article-contacting side and an opposite side, wherein the first edge of a rigid belt module is spaced apart from the second edge of a consecutive rigid belt module across a gap whose length in the direction of belt travel equals or exceeds the length of the rigid belt modules in the direction of belt travel;
    a plurality of resilient segments joining consecutive rigid belt modules and filling the gaps to form a flexible hinge between consecutive rigid belt modules and, together with the article-contacting side of the rigid belt modules, a continuous article-conveying surface of the belt.

18. A conveyor belt as in claim 17 further comprising tension members extending through the resilient segments and bridging the gaps to bear the majority of the belt tension through the gaps.

19. A conveyor belt as in claim 17 further comprising wings extending outward from the first and second edges of the rigid belt modules into the gaps, wherein the resilient segments encapsulate the wings.

20. A conveyor belt as in claim 19 wherein the wings have perforations through which the material forming the resilient segments extends to anchor the resilient segments to the wings.

21. A conveyor belt as in claim 17 wherein the resilient segments are made of a rigid material and are thinner in the middle of the gap to give the resilient segments their resiliency.

22. A conveyor belt as in claim 17 wherein the resilient segments are made of an elastomeric material.

23. A conveyor belt comprising:
    a plurality of rigid belt modules, each extending in a direction of belt travel from a first edge to a second edge and having an article-contacting side and an opposite side, wherein the first edge of a rigid belt module is spaced apart from the second edge of a consecutive rigid belt module across a gap;
    a plurality of resilient elastomeric segments molded directly to the first and second edges of consecutive belt modules and filling the gaps to form a flexible hinge between consecutive rigid belt modules and, together with the article-contacting side of the rigid belt modules, a continuous article-conveying surface of the belt.

24. A conveyor belt as in claim 23 wherein the rigid belt modules include a bar extending outward from the opposite side perpendicular to the direction of belt travel to a distal end.

25. A conveyor belt as in claim 24 wherein the distal end of the bar is spaced farther apart from the article-contacting side than is any other module structure.

26. A conveyor belt as in claim 23 wherein the length of the gaps in the direction of belt travel equals or exceeds the length of the modules in the direction of belt travel.

27. A method for making a conveyor belt, comprising:
(a) molding a rigid belt module onto an arrangement of elongated tension members extending past leading and trailing edges of the belt module;
(b) molding a resilient filler onto the arrangement of elongated tension members adjacent to the trailing edge of the rigid belt module;
(c) repeating steps (a) and (b) to form a conveyor belt of desired length having an alternating sequence of rigid belt modules and resilient fillers along the length of the elongated tension members.

* * * * *